United States Patent
Nhep

(10) Patent No.: US 8,702,323 B2
(45) Date of Patent: Apr. 22, 2014

(54) STRAIN RELIEF BOOT FOR A FIBER OPTIC CONNECTOR

(75) Inventor: Ponharith Nhep, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 142 days.

(21) Appl. No.: 13/420,301

(22) Filed: Mar. 14, 2012

(65) Prior Publication Data
US 2012/0257858 A1 Oct. 11, 2012

Related U.S. Application Data

(60) Provisional application No. 61/452,935, filed on Mar. 15, 2011.

(51) Int. Cl.
*G02B 6/38* (2006.01)
*G02B 6/36* (2006.01)

(52) U.S. Cl.
CPC ............ *G02B 6/3887* (2013.01); *G02B 6/3889* (2013.01)
USPC .......................................................... 385/86

(58) Field of Classification Search
CPC ............................ G02B 6/3887; G02B 6/3889
USPC .......................................................... 385/86
See application file for complete search history.

(56) References Cited

U.S. PATENT DOCUMENTS

| | | | |
|---|---|---|---|
| 3,395,244 A | 7/1968 | Koehler | |
| 4,050,783 A | 9/1977 | Tardy | |
| 4,190,316 A | 2/1980 | Malsby et al. | |
| 4,225,214 A | 9/1980 | Hodge et al. | |
| 4,291,941 A | 9/1981 | Melzer | |
| 4,309,071 A | 1/1982 | Prunier | |
| 4,320,938 A | 3/1982 | Gunnersen et al. | |
| 4,373,777 A | 2/1983 | Borsuk et al. | |
| 4,807,958 A | 2/1989 | Gunner et al. | |
| 5,094,552 A * | 3/1992 | Monroe et al. | 385/76 |
| 5,261,019 A | 11/1993 | Beard et al. | |
| 5,317,633 A | 5/1994 | Hiraiwa | |
| 5,321,784 A | 6/1994 | Cubukciyan et al. | |

(Continued)

FOREIGN PATENT DOCUMENTS

| | | |
|---|---|---|
| JP | 8-122567 | 5/1996 |
| JP | 2011-2705 | 1/2011 |

OTHER PUBLICATIONS

International Search Report and Written Opinion mailed Oct. 23, 2012.

*Primary Examiner* — Rhonda Peace
(74) *Attorney, Agent, or Firm* — Merchant & Gould P.C.

(57) ABSTRACT

A connector including a housing having a distal end and a proximal end has a ferrule assembly having a ferrule and a ferrule spring. The ferrule spring biases the ferrule in a distal direction. A boot is mounted at the proximal end. The boot has a distal end mounting over the proximal end of the housing and a proximal end and defines a central axis. A central passage extends through a length of the boot. A strain relief portion is adjacent the proximal end of the boot and has a truncated, conical outer shape formed by co-axial rings separated by gaps, the rings being interconnected by links extending across the gaps. The central passage has a proximal portion corresponding to a length of the strain relief portion that defines a transverse cross-dimension A majority of the rings have radial thicknesses at least 50 percent as long as the transverse cross-dimension.

16 Claims, 7 Drawing Sheets

(56) References Cited

U.S. PATENT DOCUMENTS

| | | |
|---|---|---|
| 5,390,272 A | 2/1995 | Repta et al. |
| 5,748,819 A * | 5/1998 | Szentesi et al. ............. 385/60 |
| 5,862,282 A | 1/1999 | Matsuura et al. |
| 5,915,056 A | 6/1999 | Bradley et al. |
| 5,953,476 A * | 9/1999 | Abe ............................ 385/87 |
| 6,419,402 B1 | 7/2002 | Zimmel |
| 7,147,385 B2 | 12/2006 | Zimmel et al. |
| 7,407,331 B2 * | 8/2008 | Momotsu et al. ............. 385/69 |
| 7,534,050 B2 | 5/2009 | Kachmar |
| 7,537,393 B2 * | 5/2009 | Anderson et al. ............. 385/54 |
| 7,677,812 B2 | 3/2010 | Castagna et al. |
| 7,758,256 B2 | 7/2010 | Hopkins et al. |
| 7,758,257 B2 * | 7/2010 | Anderson et al. ............. 385/87 |
| 2003/0095754 A1 * | 5/2003 | Matsumoto et al. ........... 385/86 |
| 2006/0280408 A1 * | 12/2006 | Anderson et al. ............. 385/54 |
| 2007/0292084 A1 | 12/2007 | Gurreri et al. |
| 2008/0025670 A1 | 1/2008 | Castagna et al. |
| 2008/0138018 A1 * | 6/2008 | Momotsu et al. ............. 385/86 |
| 2009/0297104 A1 | 12/2009 | Kachmar |
| 2009/0304335 A1 * | 12/2009 | Marcouiller et al. .......... 385/78 |
| 2009/0324181 A1 * | 12/2009 | Kachmar et al. ............. 385/104 |
| 2010/0254659 A1 * | 10/2010 | Anderson et al. ............. 385/54 |
| 2010/0254663 A1 | 10/2010 | Hopkins et al. |
| 2011/0002586 A1 | 1/2011 | Nhep |
| 2012/0257858 A1 * | 10/2012 | Nhep ............................ 385/78 |
| 2012/0257859 A1 * | 10/2012 | Nhep ............................ 385/81 |

* cited by examiner

STRAIN RELIEF BOOT FOR A FIBER OPTIC CONNECTOR

CROSS REFERENCE TO RELATED APPLICATION

This application claims the benefit of U.S. Provisional Patent Application Ser. No. 61/452,935, filed Mar. 15, 2011, which application is hereby incorporated by reference in its entirety.

TECHNICAL FIELD

The present disclosure relates generally to optical fiber communication systems. More particularly, the present disclosure relates to strain relief boots of fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Fiber optic connectors often include strain relief boots mounted at proximal ends of the connector housings. Strain relief boots are designed to prevent the optical fibers within the fiber optic cables secured to the fiber optic connectors from bending to radii less than the minimum bend radii of the optical fibers when side loads are applied to the fiber optic cables. Example strain relief boot configurations are disclosed in United States Patent Application Publication Nos. US 2011/0002586 and US 2010/0254663; and are also disclosed in U.S. Pat. Nos. 7,677,812; 7,147,385; 5,915,056; 5,390,272; and 5,261,019.

A number of factors are important with respect to the design of a fiber optic connector. One such factor relates to connector size and the ability to provide enhanced connector/circuit densities. Another factor relates to the ability to provide high signal quality connections with minimal signal degradation.

SUMMARY

One aspect of the present disclosure relates to a fiber optic connector having features that enhance connector density. In one embodiment, the connector can include a compact strain relief boot that provides bend radius protection to an optical fiber routed to the connector.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
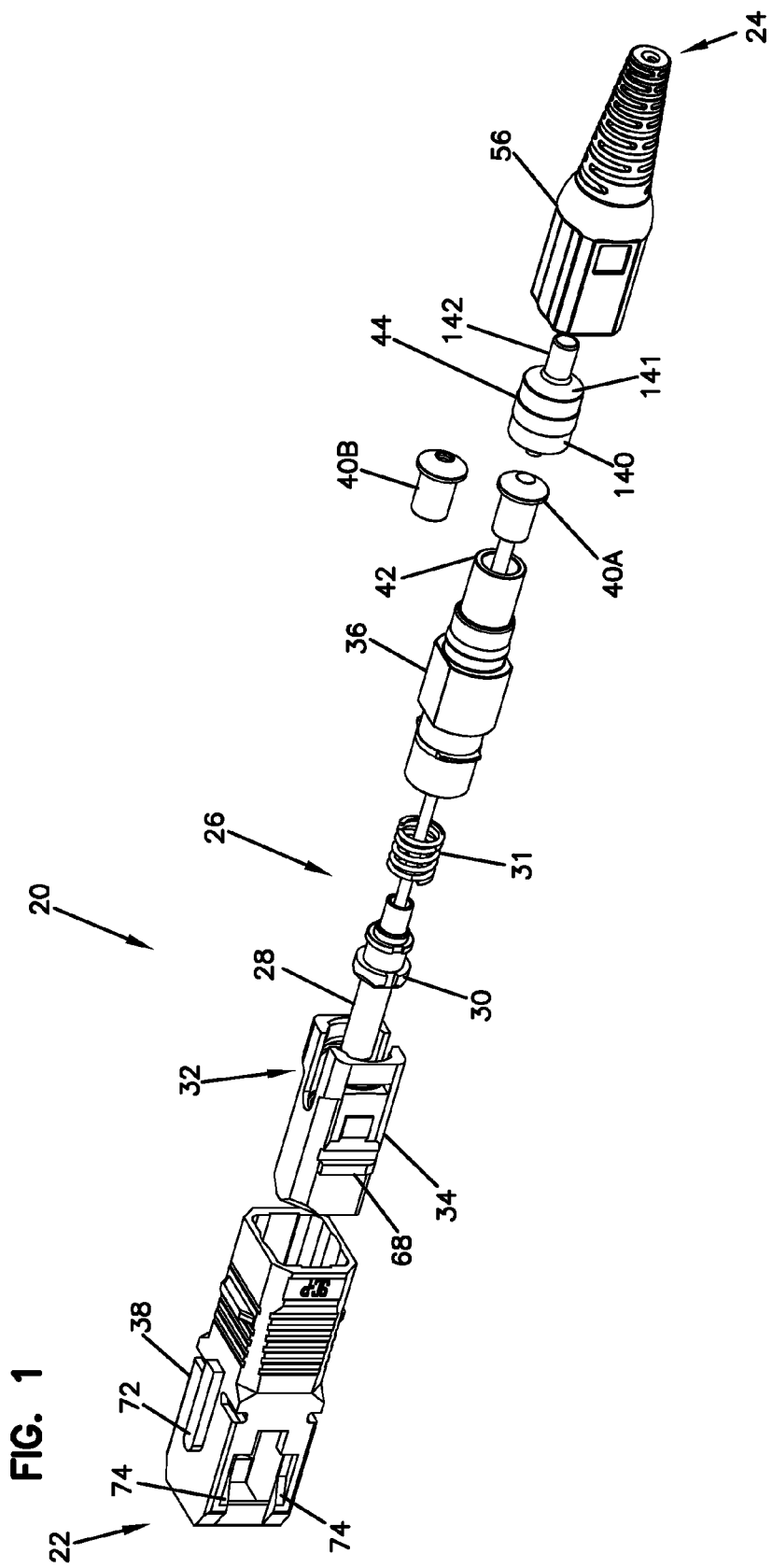
FIG. 1 is a perspective, exploded view of a fiber optic connector in accordance with the principles of the present disclosure.
Figure 2:
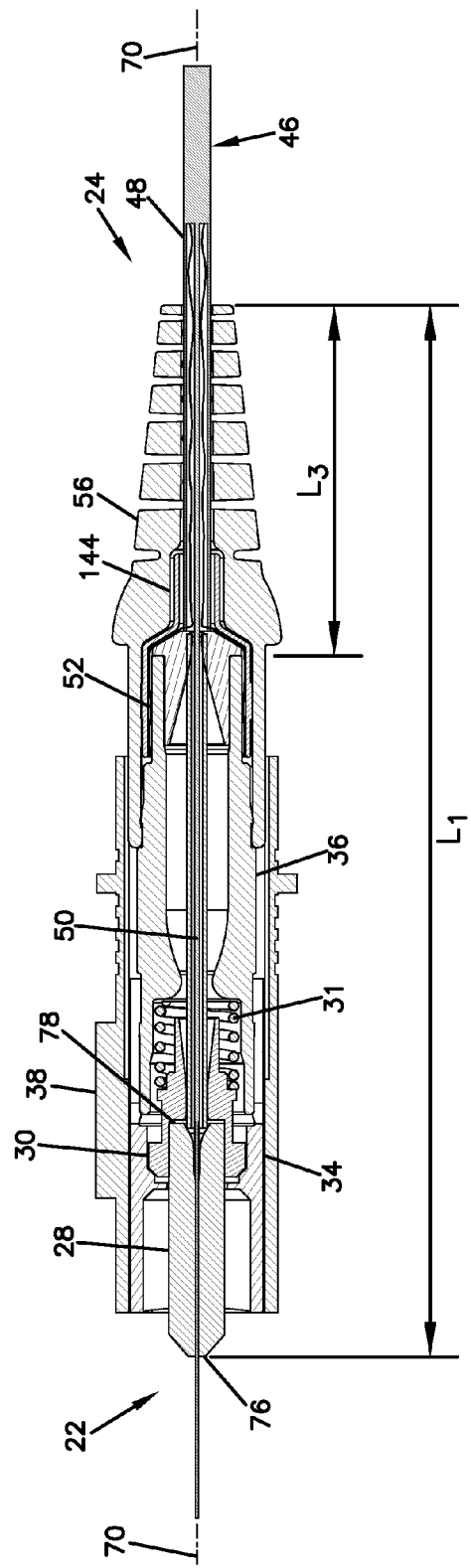
FIG. 2 is a cross-sectional view that longitudinally bisects the fiber optic connector of FIG. 1.

FIGS. 1 and 2 illustrate a first fiber optic connector 20 in accordance with the principles of the present disclosure. The fiber optic connector 20 has a total length $L_1$ that extends from a distal end 22 of the fiber optic connector 22 a proximal end 24 of the fiber optic connector 20. The fiber optic connector 20 includes a ferrule assembly 26 that mounts adjacent the distal end 22 of the fiber optic connector 20. The ferrule assembly includes a ferrule 28, a hub 30 and a spring 31. The ferrule assembly 26 mounts at least partially within a connector housing 32 including a distal housing portion 34 that interconnects with a proximal housing portion 36. The fiber optic connector 20 also includes a release sleeve 38 that slidably mounts over the connector housing 32. The fiber optic connector 20 further includes an insertion cap 40A that mounts inside a proximal end 42 of the proximal housing portion 36 and a crimp sleeve 44 that mounts around the exterior of the proximal end 42 of the proximal housing portion 36. The proximal end 24 of the fiber optic connector 20 is configured to receive, anchor and provide strain relief/bend radius protection to a fiber optic cable 46. The fiber optic cable 46 includes a jacket 48 surrounding at least one optical fiber 50. The fiber optic cable 46 also includes a strength layer 52 formed by a plurality of strength members (e.g., reinforcing fibers such as aramid yarn/Kevlar) positioned between the optical fiber 50 and the jacket 48. A distal end portion of the strength layer 52 is crimped between the crimp sleeve 44 and the exterior surface of the proximal end 42 of the proximal housing portion 36 so as to anchor the strength layer 52 to the connector housing 32. The optical fiber 50 is routed through the total length $L_1$ of the fiber optic connector 20 and includes a distal portion 54 secured within the ferrule 28. The fiber optic connector 20 further includes a strain relief boot 56 mounted at the proximal end 24 of the fiber optic connector 20 for providing strain relief and bend radius protection to the optical fiber 50. Further details about the connector 20 are provided in U.S. Provisional Patent Application Ser. No. 61/452,953, which is entitled FIBER OPTIC CONNECTOR, and which has been filed on a date concurrent with the filing of the present application.

Figure 6:
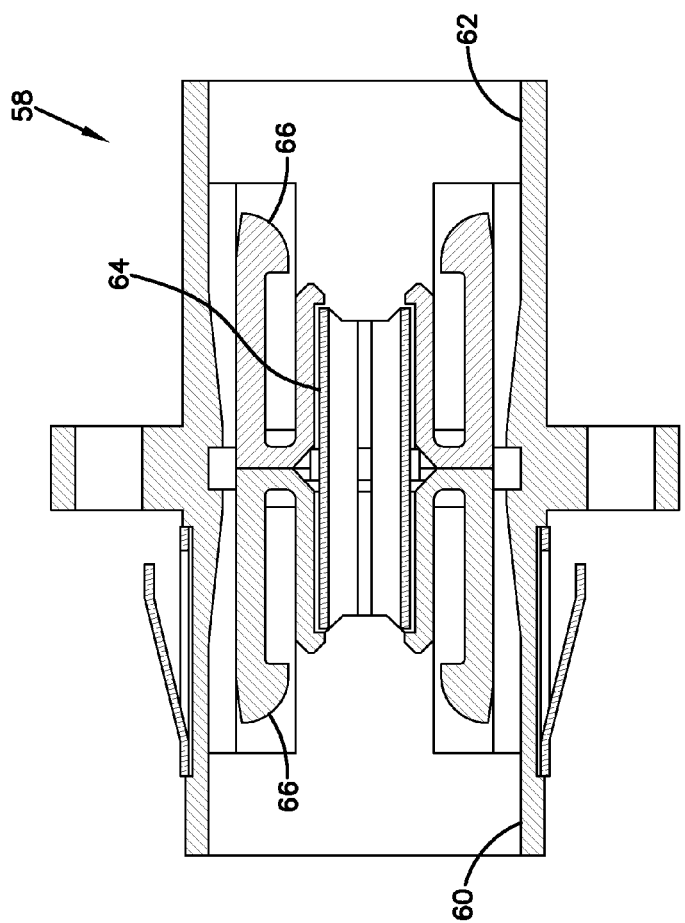
FIG. 6 is a cross-sectional view that longitudinally bisects a prior art fiber optic adapter.

It will be appreciated that the fiber optic connector 20 is adapted to be mechanically coupled to a like fiber optic connector by an intermediate fiber optic adapter. FIG. 6 shows an example fiber optic adapter 58 that can be used to couple two of the fiber optic connectors 20 together. The fiber optic adapter 58 includes an adapter housing 59 defining opposite, coaxially aligned ports 60, 62 for receiving two of the fiber optic connectors desired to be coupled together. The fiber optic adapter 58 also includes an alignment sleeve 64 for receiving and aligning the ferrules 28 of the fiber optic connectors desired to be connected together. The fiber optic adapter 58 further includes latches 66 for mechanically retaining the fiber optic connectors 20 within their respective ports 60, 62. The latches 66 can be configured to engage shoulders 68 provided on the distal housing portions 34 of the fiber optic connectors 20 being coupled together. Further details regarding the fiber optic adapter 58 can be found in U.S. Pat. No. 5,317,633, which is hereby incorporated by reference in its entirety.

In the depicted embodiment of FIG. 1, the release sleeve 38 is shown as a conventional SC release sleeve. When the release sleeve 38 is mounted on the connector housing 32, the release sleeve 38 is free to slide back-and-forth in distal and proximal directions relative to the connector housing 32 along a central longitudinal axis 70 of the fiber optic connector 20. When the fiber optic connector 20 is inserted within one of the ports 60, 62 of the fiber optic adapter 58, the keying rail 72 provided on the release sleeve 38 ensures that the fiber optic connector 20 is oriented at the appropriate rotational orientation relative to the fiber optic adapter 58. When the fiber optic connector 20 is fully inserted within its corresponding port 60, 62, the latches 66 snap into a latching position in which the latches engage the shoulders 68 of the connector housing 32 to prevent the fiber optic connector 20 from being proximally withdrawn from the port 60, 62. The release sleeve 38 is provided to allow the fiber optic connector 20 to be selectively withdrawn from its respective port 60, 62. Specifically, by pulling the release sleeve 38 in a proximal direction, ramps 74 of the release sleeve disengage the latches 66 of the fiber optic adapter 58 from the shoulders 68 of the fiber optic connector 20 thereby allowing the fiber optic connector 20 to be proximally withdrawn from its respective port 60, 62.

Referring to FIG. 2, the ferrule 28 of the ferrule assembly 26 includes a distal end 76 and a proximal end 78. The distal end 76 projects distally outwardly beyond a distal end of the connector housing 32 and the proximal end 78 is secured within the ferrule hub 30. When the connector housing 32 is assembled as shown at FIG. 2, the ferrule hub 30 and the spring 31 are captured between the distal housing portion 34 and the proximal housing portion 36 of the connector housing 32. As so configured, the spring 31 is configured to bias the ferrule 28 in a distal direction relative to the connector housing 32. When two of the fiber optic connectors 20 are interconnected, their ferrules 28 are forced to move in proximal directions relative to their respective connector housings 34 against the bias of their respective springs 31. The movement is along the central axes 70 of the mated fiber optic connectors 20.

Figure 7:
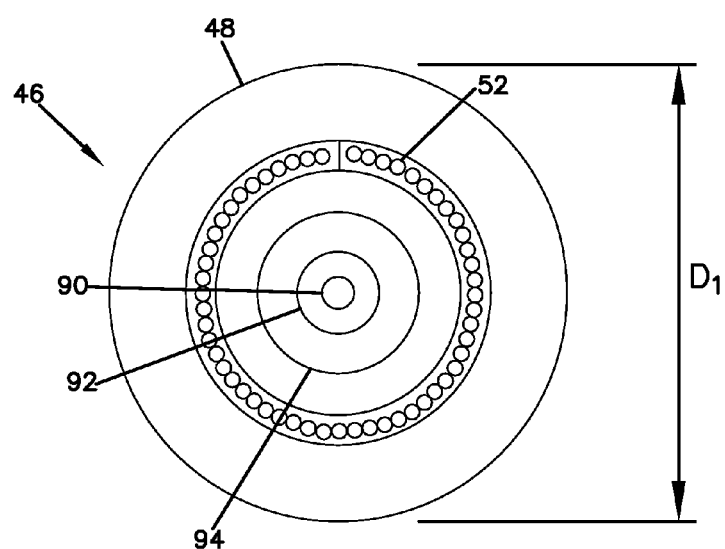
FIG. 7 is a cross-sectional view taken along section line 7-7 of FIG. 2.

Referring to FIGS. 2 and 7, the jacket 48 of the fiber optic cable 46 preferably has a relatively small outer diameter $D_1$. In certain embodiments, the outer diameter $D_1$ can be less than 2 millimeters, or less than 1.5 millimeters, less than equal to about 1.2 millimeters. In certain embodiments, the optical fiber 50 within the jacket 48 can include a core 90, a cladding layer 92 surrounding the core and one or more coating layers 94 surrounding the cladding layer 92. In certain embodiments, the core 90 can have an outer diameter of about 10 microns, the cladding layer 92 can have an outer diameter of about 125 microns, and the one or more coating layers 94 can have an outer diameter in the range of about 240 to 260 microns. The strength layer 52 provides tensile reinforcement to the cable 46. The strength layer 52 relatively closely surrounds the coating layer 94 of the optical fiber 50. In addition to providing tensile strength to the cable 46, the strength layer 52 also functions as a separator for separating the optical fiber 50 from the outer jacket 48. In certain embodiments, no buffer layer or buffer tube is provided between the coating layer 94 of the optical fiber 50 and the strength layer 52. Further details regarding the fiber optic cable 46 can be found in U.S. patent application Ser. No. 12/473,931, which is hereby incorporated by reference in its entirety.

As shown at FIG. 2, the optical fiber 50 extends through the total length $L_1$ of the fiber optic connector 20. For example, the optical fiber 50 extends through the strain relief boot 56, the insertion cap 40A, the connector housing 32 and the ferrule 28. In certain embodiments, a portion of the optical fiber 50 extending proximally from the ferrule 28 through the fiber optic connector 20 to the jacketed portion of the fiber optic cable 46 includes only the core 90, the cladding layer 92 and the one or more coating layers 94. The portion of the optical fiber 50 extending through the ferrule 28 typically only includes the core 90 and the cladding layer 92. A distal most end face of the optical fiber 50 is preferably polished as is conventionally known in the art.

As shown at FIG. 2, the insertion cap 40A is mounted within the proximal end 42 of the proximal housing portion 36 of the connector housing 32. The insertion cap 40A has an inner diameter sized to correspond with the outer diameter of the coating layer 94 of the optical fiber 50. In alternative embodiments, it may be desirable to cover/protect the portion of the optical fiber 50 extending through the connector housing 32 with a protective layer such as a 900 micron tube (e.g., a 900 micron furcation tube). To accommodate such a protective tube, the insertion cap 40A can be replaced with an insertion cap 40B having an inner diameter that is larger than the inner diameter of the cap 40A. In certain embodiments, inner diameter of the cap 40B can correspond to the outer diameter of protective buffer tube provided about the coating layer 94 of the optical fiber 50 within the connector housing 32.

The use of the insertion cap 40A or the insertion cap 40B allows the proximal end 42 of the connector housing 32 to have a relatively large open transverse cross-sectional area. This large transverse cross-sectional area is advantageous because it facilitates delivering potting material (e.g., and adhesive material such as epoxy) to the back side of the ferrule 28 during assembly for potting the fiber 50 within the ferrule 28. Typically, a needle can be used to deliver potting material to the ferrule 28. The large cross-sectional area provides better access for allowing a needle to be inserted through the proximal end of the connector housing 32 to accurately injecting potting material into the ferrule 28.

The crimp sleeve 44 of the fiber optic connector 20 includes a sleeve portion 140 and a stub portion 142 that projects proximately outwardly from a proximal end of the sleeve portion 140. A radial in-step 141 is provided between the sleeve portion 140 and the stub portion 142 such that the sleeve portion 140 has a larger diameter than the stub portion 142. A passage extends axially throughout the length of the crimp sleeve 44. Passage has a smaller diameter through the stub portion 142 and a larger diameter through the sleeve portion 140. When the fiber optic connector 20 is assembled, the sleeve portion 140 is crimped about the exterior surface of the connector housing 32 adjacent the proximal end 42 of the connector housing 32. The exterior surface of the connector housing 32 can be textured (e.g., knurled, ridged, provided with small projections, etc.) to assist in retaining the crimp on the housing 32. Preferably, a distal portion of the strength layer 52 of the fiber optic cable 46 is crimped between the sleeve portion 140 and the exterior surface of the connector housing 32 such that the strength layer 52 of the cable 46 is anchored relative to the connector housing 32. The stub portion 142 fits within a pocket 144 provided within the strain relief boot 56. The stub portion 142 coaxially aligns with the central longitudinal axis 70 of the fiber optic connector 20. The insertion cap 40A is captured between the proximal end 42 of the connector housing 32 and the crimp sleeve 44. This way, the crimp sleeve 44 assists in retaining the insertion cap 40A in the proximal end 42 of the connector housing 32. The insertion cap 40A can also be held within the connector housing 22 by an adhesive material such as epoxy.

To assemble the fiber optic connector 20, the ferrule assembly 26 is first loaded into the distal housing portion 34 of the connector housing 32. Next, the proximal housing portion 36 is connected to the distal housing 34 (e.g., by a snap fit connection) such that the ferrule hub 30 and the spring 31 are captured within the connector housing 32 at a location between the distal housing portion 34 and the proximal housing portion 46. Next, an epoxy needle is inserted through the proximal end 42 of the proximal housing portion 36 and is used to inject epoxy into the fiber passage defined through the ferrule 28. Once the epoxy has been applied, the epoxy needle is removed and the insertion cap 40A or the insertion cap 40B is inserted into the proximal end 42 of the connector housing 32. Thereafter, the strain relief boot 56 and the crimp sleeve 44 are inserted over the fiber optic cable 46 and a distal end portion of the cable is prepared.

As part of the cable preparation process, the jacket 48 is stripped from the distal end portion of the optical fiber. Also, the coating layers 94 are stripped from the distalmost portion of the optical fiber 50 intended to be inserted through the passage defined by the ferrule 28. Moreover, the strength layer 52 is trimmed to a desired length. Once the fiber optic cable 46 has been prepared, the distal end portion of the optical fiber 50 is inserted through the insertion cap 40A and into the ferrule 28 which has been potted with epoxy. During the insertion process, the transition 104b assists in guiding the distalmost end portion of the optical fiber 50 into the ferrule 28. Once the fiber insertion process has been completed, the crimp sleeve 44 is slid distally over the proximal end 42 of the connector housing 32 and used to crimp the distal end of the strength layer 52 about the exterior surface of the connector housing 32 adjacent to the proximal end 42. The strain relief boot 56 is then slid distally over the crimp sleeve 44 and proximal end 42 of the housing 32. Finally, the release sleeve 38 is inserted over the distal end 22 of the fiber optic connector 20 and snapped into place over the connector housing 32.

Figure 3:
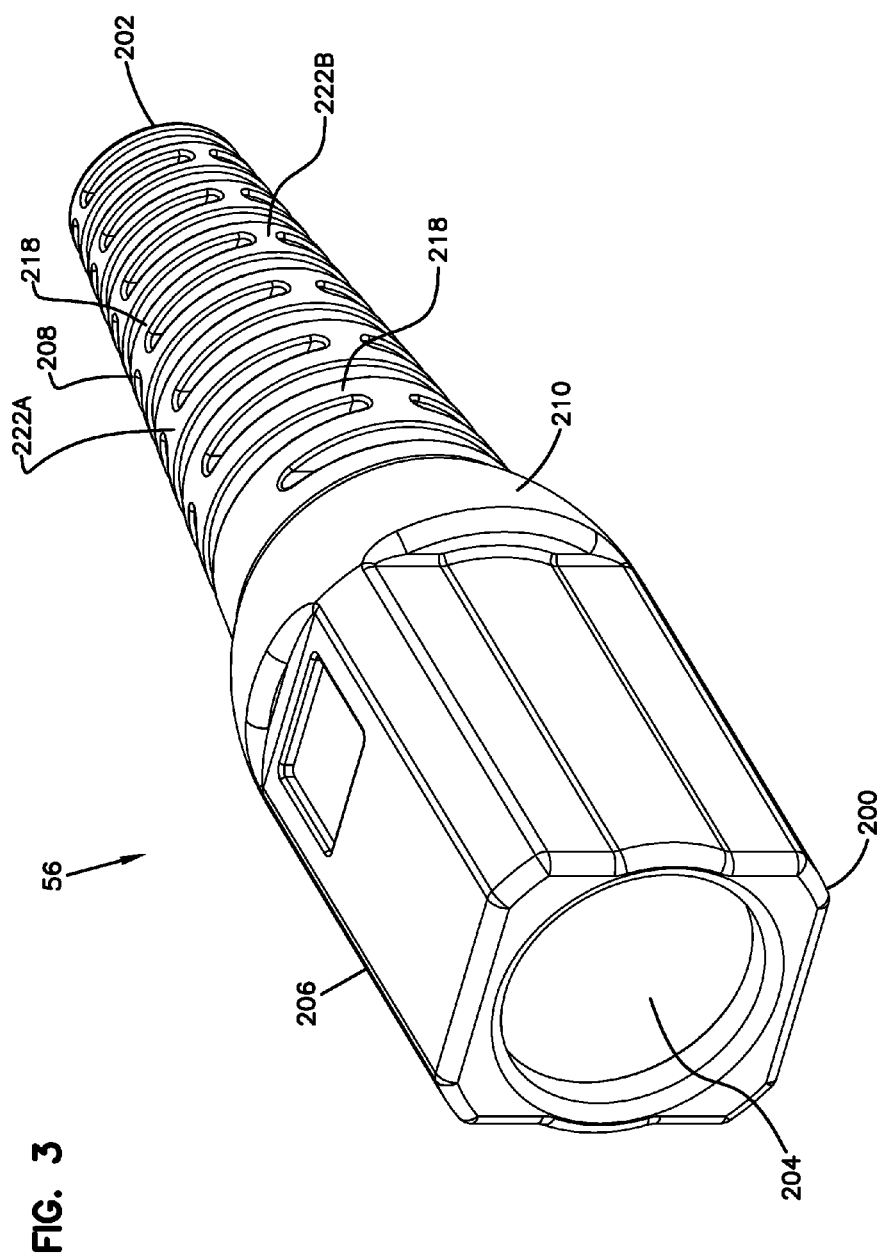
FIG. 3 is a perspective view showing a first end of a strain relief boot of the fiber optic connector of FIG. 1.
Figure 4:
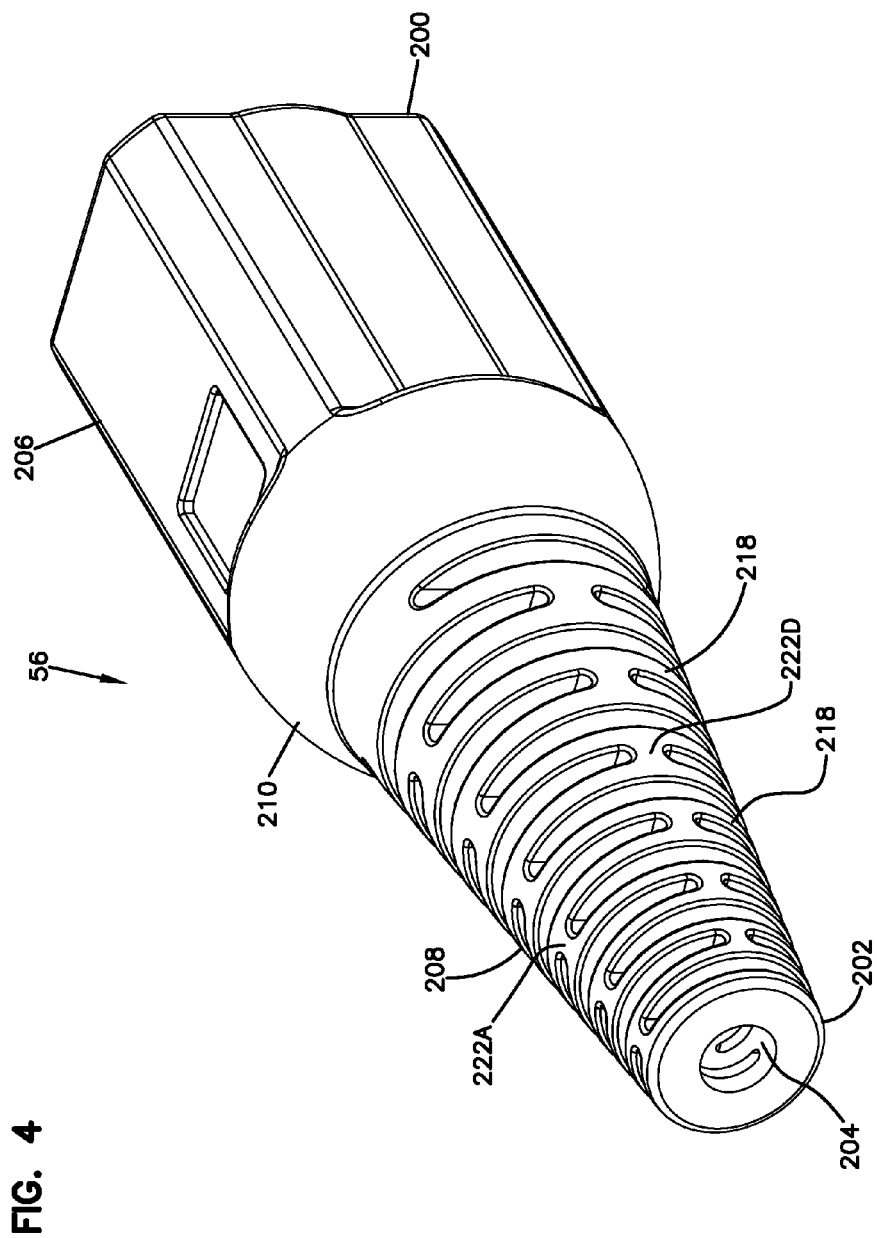
FIG. 4 is a perspective view showing a second end of the strain relief boot of FIG. 3.
Figure 5:
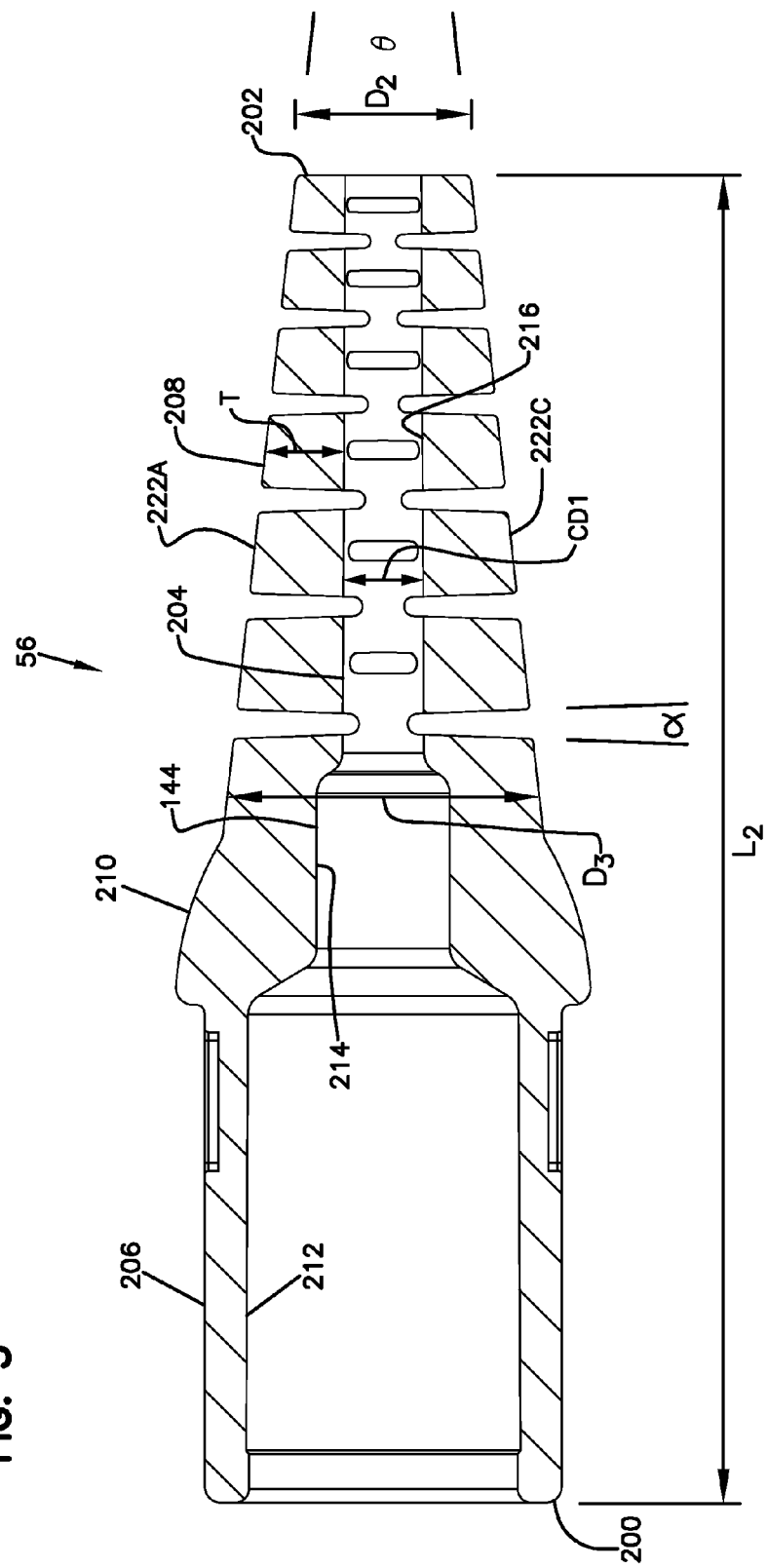
FIG. 5 is a cross-sectional view that longitudinally bisects the strain relief boot of FIGS. 3 and 4.

Referring to FIGS. 3-5, the strain relief boot 56 of the fiber optic connector 20 includes a distal end 200 and an opposite proximal end 202. The strain relief boot defines an inner passage 204 that extends through the boot from the proximal end 202 to the distal end 200. When the boot 56 is mounted on the connector housing 32, the inner passage 204 aligns with the central longitudinal axis 70 of the fiber optic connector 20. The boot 56 includes a connection portion 206 positioned adjacent the distal end 200 and a tapered, strain relief portion 208 positioned adjacent the proximal end 202. The connection portion 206 has a larger cross-dimension than a corresponding cross-dimension of the tapered, strain relief portion 208. A transition portion 210 is positioned between the connection portion 206 and the tapered, strain relief portion 208. An outer surface of the transition portion provides a gradual increase in cross-dimension as the outer surface extends from the tapered, strain relief portion 208 to the connection portion 206. The outer surface of the transition portion 210 can be manually pushed to facilitate inserting the connection portion 206 over the proximal end 42 of the connector housing 32 during assembly of the fiber optic connector 20.

The connector portion 206 of the boot 56 has an outer shape that is generally rectangular when viewed in transverse cross-section. The connection portion 206 defines an enlarged region 212 of the inner passage 204. The enlarged region 212 is generally cylindrical and is configured to receive the proximal end 42 of the connector housing 32 when the boot 56 is mounted on the connector housing 32. Specifically, the enlarged region 212 is sized to receive the sleeve portion 140 of the crimp sleeve 44 which is crimped over the proximal end 42 of the connector housing 32. An intermediate region 214 of the inner passage 204 defines the pocket 144 configured for receiving the stub portion 142 of the crimp sleeve 44. The intermediate region 214 coincides generally with the transition portion 210 of the boot 56. A strain relief region 216 of the inner passage 204 extends through the tapered, strain relief portion 208 of the boot 56. The strain relief region 216 defines a generally constant cross dimension CD1 (e.g., inner diameter) as the strain relief region 216 that extends from the intermediate region 214 of the inner passage 204 to the proximal end 202 of the boot 56. In certain embodiments, the CD1 generally coincides with the outer diameter of the jacket 48 of the fiber optic cable 46. For example, in one embodiment, the cross-dimension CD1 is a diameter that is only slightly larger than 1.2 millimeters such that the fiber optic cable 46 can be inserted through the strain-relief region 216 of the inner passage 204 with the tapered, strain relief portion 208 of the boot 56 fitting fairly snugly about the jacket 48 of the fiber optic cable 46.

The tapered, strain relief portion 208 of the boot 56 is depicted as having a truncated conical configuration with a minor outer diameter $D_2$ positioned at the proximal end 202 of the boot 56 and a major outer diameter $D_3$ positioned adjacent the transition portion 210. The tapered, strain relief portion 208 is formed by a plurality of rings 218 that are generally coaxially aligned with one another and centered about the central longitudinal axis 70. The rings 218 are axially separated from one another by circumferential gaps 220 (e.g., slots). The rings 218 are interconnected to one another by an arrangement of axial links (e.g., struts, connection points, etc.) that extend across the circumferential gaps 220. The links can include a first set of links 222A aligned along a first axial row, a second set of links 222B aligned along a second axial row, a third set of links 222C aligned along a third axial row, and a fourth set of links 222D aligned along a fourth axial row. The four rows of links are spaced uniformly in 90 degree increments about the central axis 70. Thus, the first and third sets of links 222A and 222C are aligned along a first plane and the second and fourth sets of links 222B and 222D are aligned along a second plane that is perpendicular to the first plane. The links of the first third sets of links 222A, 222C interconnect the first and second rings, the third and fourth rings, the fifth and sixth rings, the seventh and eighth rings, the ninth and tenth rings, and so on starting from the proximal end 202 of the boot 56. The links of the second and fourth sets of links 222B and 222D interconnect the second and third rings, the fourth and fifth rings, the sixth and seventh rings, the eighth and ninth rings, the tenth and eleventh rings, and so on starting from the proximal end 202 of the boot 56. Thus, the links of the first and third sets 222A, 222C are arranged to traverse alternating ones of the circumferential gaps 220 as compared to the links of the second and fourth sets 220B and 220D.

The boot 56 has a length $L_2$ that is relatively short. In one embodiment the length $L_2$ is less than one inch. In a preferred embodiment, the length $L_2$ is less than one-half of the total length $L_1$ of the fiber optic connector 20. In certain embodiments, the portion of the boot projecting proximally from the connector housing 32 has a length $L_3$ that is less than one-third the total length $L_1$ of the fiber optic connector 20. In certain embodiments, the length $L_3$ is less than 0.75 inches.

The boot 56 is preferably made of a molded plastic material having flexible characteristics. The flexibility of the boot is enhanced at the tapered, strain relief portion 208 by the segmented configuration provided by the rings 218 connected by the axial links.

In certain embodiments, the tapered, strain relief portion 208 has an outer shape having a cone angle $\theta$ (see FIG. 5) in the range of 8 to 14 degrees. In other embodiments, the cone angle $\theta$ is in the range of 10 to 14 degrees. In still other embodiments, the cone angle $\theta$ is about 12.6 degrees.

Referring to FIG. 5, the gaps 220 can define taper angles $\alpha$ as the gaps extend radially into the boot. In certain embodiments, different taper angles $\alpha$ can be provided for each of the gaps 220.

In certain embodiments, the rings 218 can have radially thicknesses T selected to assist in providing suitable bend radius protection and strain relief to the fiber optic cable. In one embodiment, a majority of the rings 218 has a radial thickness T that is at least 50% of the cross-dimension CD1 of the strain relief region 216 of the inner passage 204. In another embodiment, all of the rings 218 have a radial thickness T that is at least 50% as large as the cross-dimension CD1 of the strain relief region 216 of the inner passage 204. In still other embodiments, at least some of the rings 218 have a radial thickness T that is at least as large as the cross-dimension CD1 of the strain relief region 216 of the inner passage 204. In other embodiments, at least one-third of the rings 218 have radial thicknesses T that are equal to or greater than the cross-dimension CD1. In further embodiments, at least half of the rings 218 have radial thicknesses T equal to or greater than the cross-dimension CD1 of the strain relief region 216 of the inner passage 204. In still further embodiments, the proximal most ring 218 has a radial thickness T that is at least 50% as large as the cross-dimension CD1 and the distalmost ring 218 has a radial thickness T that is greater than the cross-dimension C1. In certain embodiments, the inner passage 204 does not flare radially outwardly adjacent the proximal end 202 of the boot 56.

The invention claimed is:

1. A fiber optic connector comprising:
   a connector housing having a distal end and a proximal end;
   a ferrule assembly having a ferrule and a ferrule spring, the ferrule having a distal end face that is accessible at the distal end of the connector housing, the ferrule spring biasing the ferrule in a distal direction relative to the connector housing;
   a boot mounted at the proximal end of the connector housing, the boot having a distal end that mounts over the proximal end of the connector housing and a proximal end, the boot defining a central axis that extends along a length of the boot from the distal end of the boot to the proximal end of the boot, the boot defining a central passage that extends through the length of the boot, the boot including a strain relief portion adjacent the proximal end of the boot, the strain relief portion of the boot having a truncated, conical outer shape, the strain relief portion of the boot being formed by a plurality of co-axial rings separated by axial gaps, the rings being interconnected by axial links that extend across the axial gaps, the central passage having a proximal portion corresponding to a length of the strain relief portion, the proximal portion of the central passage defining a transverse cross-dimension, and a majority of the rings of the strain relief portion of the boot having radial thicknesses that are at least 50 percent as long as the transverse cross-dimension.

2. The fiber optic connector of claim 1, wherein the transverse cross-dimension is an inner diameter of the strain relief portion of the boot.

3. The fiber optic connector of claim 1, wherein all of the rings have radial thicknesses that are at least 50 percent as long as the transverse cross-dimension.

4. The fiber optic connector of claim 1, wherein at least some of the rings have radial thicknesses that are equal to or greater than a length of the transverse cross-dimension.

5. The fiber optic connector of claim 1, wherein at least one third of the rings have radial thicknesses that are equal to or greater than a length of the transverse cross-dimension.

6. The fiber optic connector of claim 1, wherein the outer shape of the strain relief portion of the boot defines a cone angle in the range of 8-14 degrees.

7. The fiber optic connector of claim 1, wherein the outer shape of the strain relief portion of the boot defines a cone angle in the range of 10-14 degrees.

8. The fiber optic connector of claim 1, wherein the fiber optic connector has a total length, and the length of the boot is less than half the total length of the fiber optic connector.

9. The fiber optic connector of claim 1, wherein the length of the boot is less than one inch.

10. The fiber optic connector of claim 1, wherein the transverse cross-dimension of the proximal portion of the central passage is less than 1.5 millimeters.

11. The fiber optic connector of claim 1, wherein a portion of the boot that projects proximally beyond the connector housing has a length less than 0.75 inches.

12. A fiber optic connector comprising:
    a connector housing having a distal end and a proximal end;
    a ferrule assembly having a ferrule and a ferrule spring, the ferrule having a distal end face that is accessible at the distal end of the connector housing, the ferrule spring biasing the ferrule in a distal direction relative to the connector housing;
    a boot mounted at the proximal end of the connector housing, the boot having a distal end that mounts over the proximal end of the connector housing and a proximal end, the boot defining a central axis that extends along a length of the boot from the distal end of the boot to the proximal end of the boot, the boot defining a central passage that extends through the length of the boot, the boot including a strain relief portion adjacent the proximal end of the boot, the strain relief portion of the boot having a truncated, conical outer shape, the strain relief portion of the boot being formed by a plurality of co-axial rings separated by axial gaps, the rings being interconnected by axial links that extend across the axial gaps, the outer shape of the strain relief portion of the boot defining a cone angle in the range of 8-14 degrees.

13. The fiber optic connector of claim 12, wherein the outer shape of the strain relief portion of the boot defines a cone angle in the range of 10-14 degrees.

14. The fiber optic connector of claim 12, wherein the fiber optic connector has a total length, and the length of the boot is less than half the total length of the fiber optic connector.

15. The fiber optic connector of claim 12, wherein the length of the boot is less than one inch.

16. The fiber optic connector of claim 12, wherein a portion of the boot that projects proximally beyond the connector housing has a length less than 0.75 inches.

* * * * *